Fig. 4
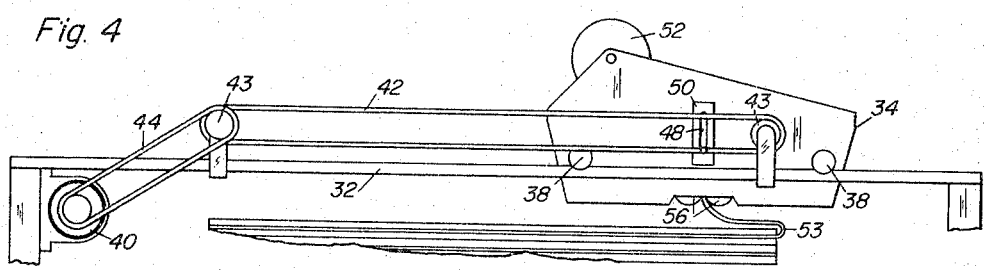
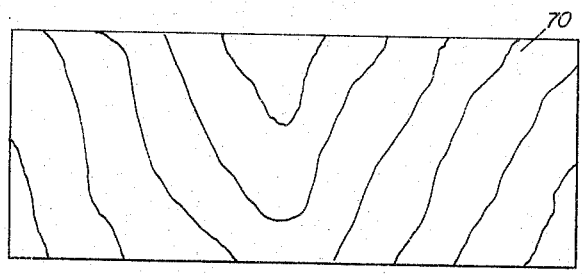
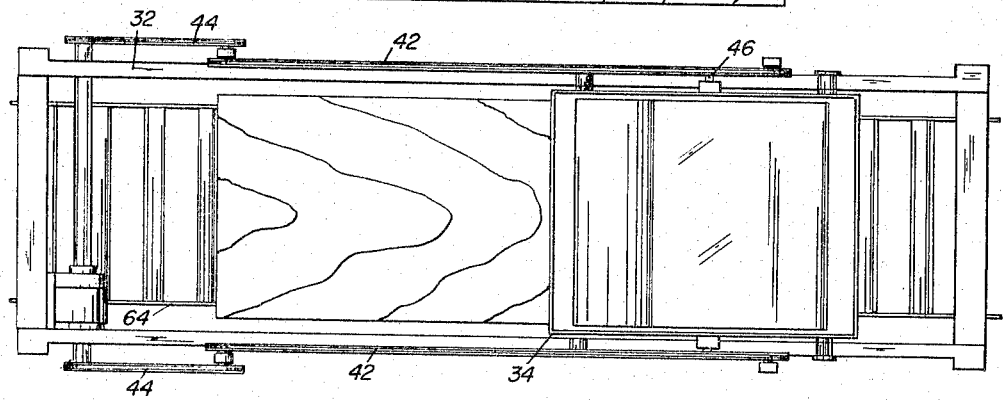
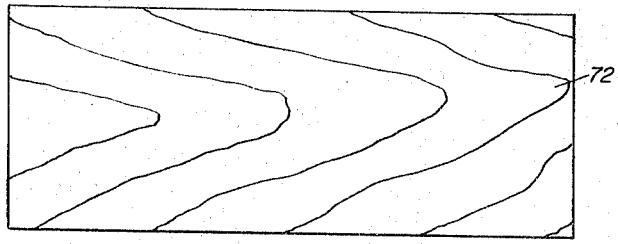
Fig. 5
INVENTORS.
Don Burnet
Russell V. Harkema
David A. Strause
BY
ATTORNEYS

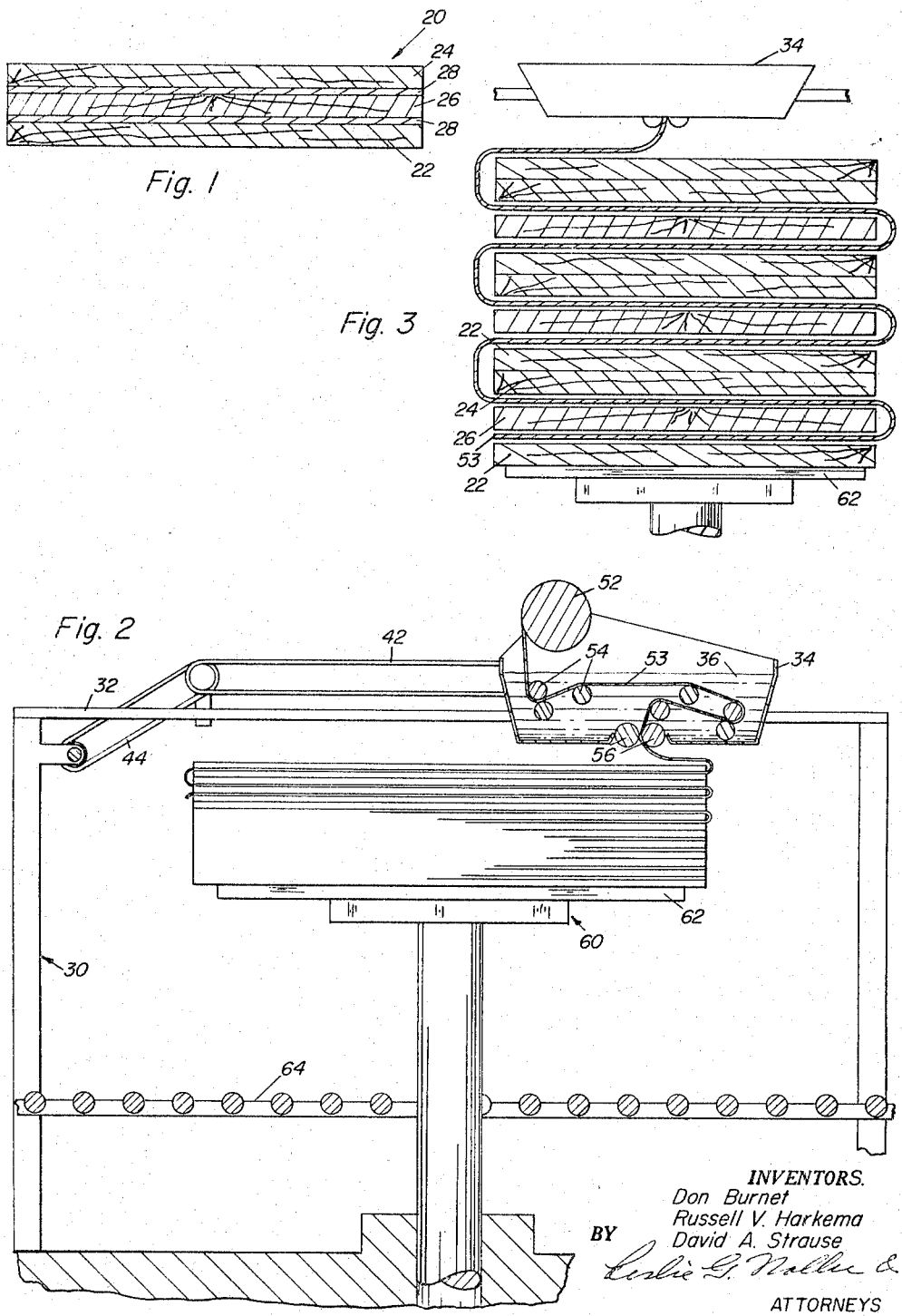

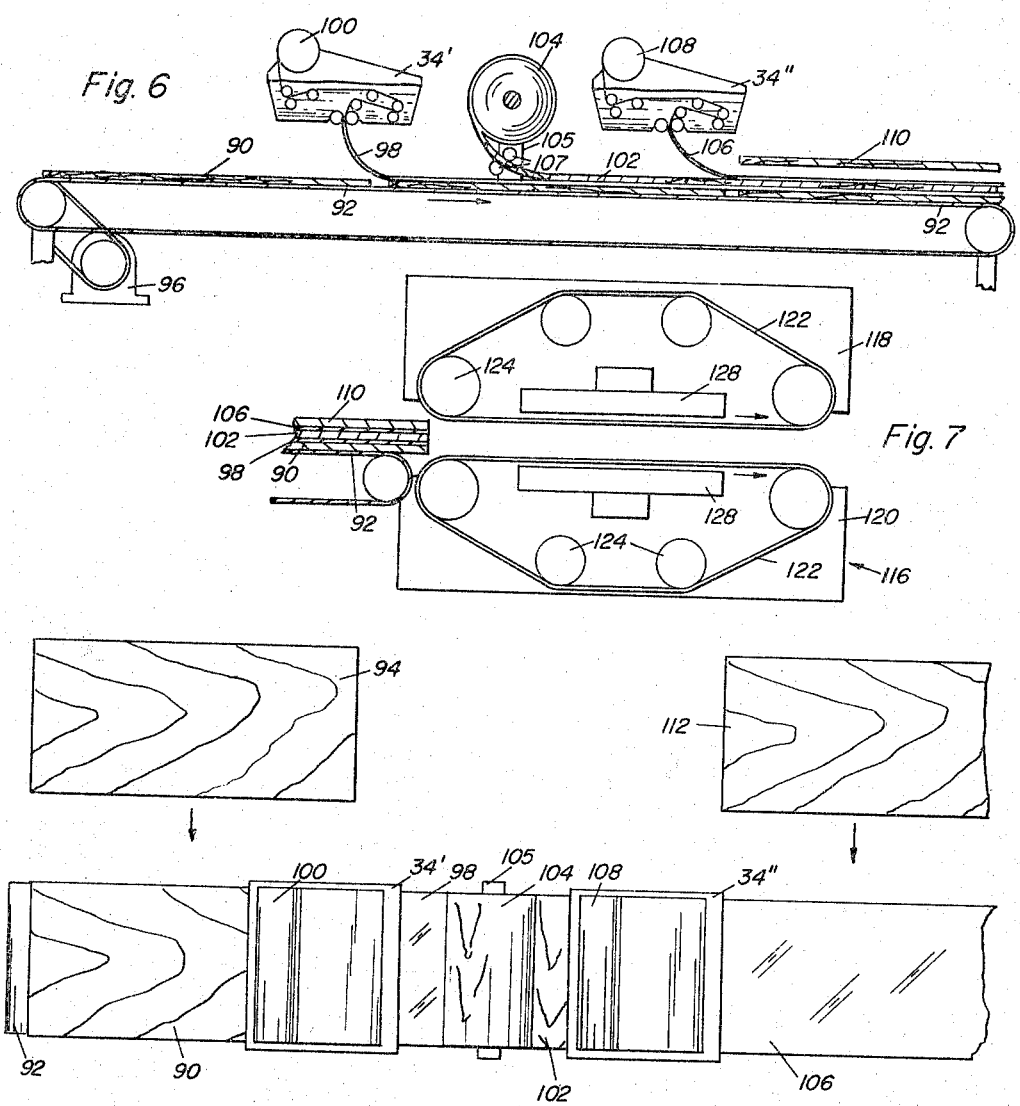

June 13, 1967

D. BURNET ET AL 3,325,334

APPARATUS FOR BONDING PLYWOOD VENEERS

Original Filed Sept. 1, 1960

INVENTORS.
Don Burnet
Russell V. Harkema
David A. Strause
BY
Leslie G. Noller &
Patrick D. Coogan
ATTORNEYS

United States Patent Office 3,325,334
Patented June 13, 1967

3,325,334
APPARATUS FOR BONDING PLYWOOD VENEERS
Don Burnet, Camas, Wash., Russell V. Harkema, Portland, Oreg., and David A. Strause, Camas, Wash., assignors to Weyerhaeuser Company, Tacoma, Wash., a corporation of Washington
Original application Sept. 1, 1960, Ser. No. 53,517. Divided and this application Oct. 15, 1965, Ser. No. 510,422
4 Claims. (Cl. 156—459)

This is a divisional application of Ser. No. 53,517, filed Sept. 1, 1960.

The present invention relates to the manufacture of laminated woody products and more particularly to the manufacture of plywood.

Conventional practice in the manufacture of plywood includes the manual handling of veneers and the use of inefficient and wasteful adhesive-applying rolls. Where dried films of adhesives are used, the attendant problems of sheet drying, cutting and stacking are experienced along with the disadvantages of long pressing times at high temperatures and pressures.

It is therefore an object of the present invention to provide new and improved apparatus for the layup of plywood panels.

Still another object of the invention is to provide new and improved apparatus permitting "continuous" rather than batch type assembly and pressing of plywood panels.

Still other objects and advantages of the present invention will become more apparent hereinafter.

In accordance with the present invention a fibrous web, such as, for example, paper, is impregnated with a liquid adhesive and immediately and while still wet positioned between layers of veneer to be bonded to one another. Semi-automatic apparatus is utilized in the lay-up operation so as to obtain a speedy, economical operation.

For a more complete description of the invention reference is made to the following detailed description thereof and the accompanying drawings wherein:

FIG. 1 is a diagrammatic cross-sectional view of a plywood panel made in accordance with the invention;

FIG. 2 is a sectional view of one embodiment of the apparatus of this invention;

FIG. 3 is a diagrammatic view illustrating the operation of the apparatus of FIG. 2;

FIG. 4 is a fragmentary side view of the apparatus of FIG. 2;

FIG. 5 is a plan view of the apparatus of FIG. 2;

FIG. 6 is a fragmentary side elevation of another embodiment of apparatus constructed in accordance with the invention;

FIG. 7 is a view of other portions of the apparatus associated with that shown in FIG. 6;

FIG. 8 is a plan view of the apparatus shown in FIG. 6;

Figure 9:
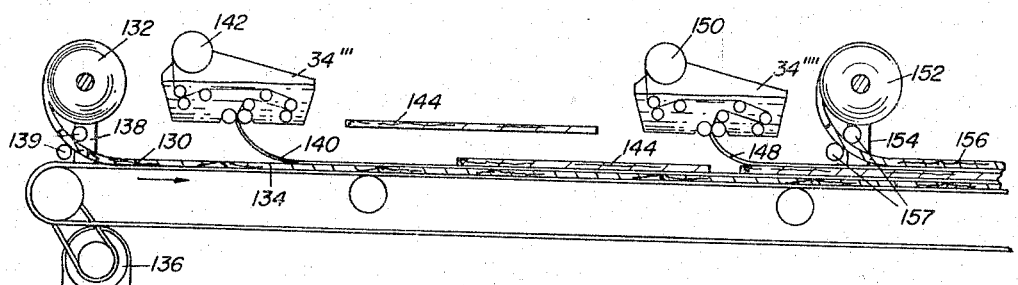
FIG. 9 is a fragmentary side elevation of still another embodiment of apparatus constructed in accordance with the invention.

FIG. 1 is a schematic cross-sectional view of a three-ply plywood panel 20 constructed by the method of the invention comprising opposite face veneers 22, 24 and a core or cross-band veneer 26. Interposed between the core veneer 26 and the corresponding face veneers 22, 24 are fibrous webs 28 which are impregnated with a suitable adhesive so that such adhesive bonds the face veneers to the core veneer. The thickness of the webs 28 is exaggerated for purposes of illustration.

Suitable semi-automatic apparatus for carrying out the process of the invention is illustrated in FIGS. 2 to 5, inclusive. Such apparatus comprises a frame 30 including a pair of horizontal rails 32 upon which is mounted a tank 34 containing a supply of adhesive 36. The tank is supported on the rails 32 by wheels 38 and means are provided for reciprocating the tank upon the rails. The illustrated means comprises a motor 40 which drives through belts 44 a pair of endless cables 42 mounted on pulleys 43 adjacent the rails 32. The cables 42 are each provided with a lug 46 which engages within a vertically extending slot 48 in brackets 50 mounted on the opposite sides of the tank. As will be evident, driving of the cables 42 will cause the tank to be reciprocated between the pulleys 43.

Mounted on the tank 34 above the level of the adhesive 36 is a roll of paper 52 from which a continuous web 53 is led through the tank around a series of rolls 54 and outwardly through the bottom of the tank between a pair of nip rolls 56 which are adapted to control the amount of adhesive retained by the web as it emerges from the tank.

Positioned beneath the path of the tank 34 is an elevator 60 having a table 62 for supporting a stack of veneers as they are laid up in a manner to be described. The elevator 60 is adapted to be lowered by suitable mechanism (not shown) so that a stack of veneers supported thereon may be transferred to roll casings 64 for transfer to a pressing apparatus.

In the lay-up of panels on the apparatus described a face veneer 22 is positioned on the table 62 with the table positioned immediately below the tank 34 and with the tank at one end of its path. The paper sheet 53 emerging from the tank 34 is positioned as shown in FIG. 3, so that the end thereof will be adjacent one end of the veneer sheet 22 and the motor 40 is started to cause the tank 34 to start its reciprocation. The adhesive impregnated sheet 53 will be deposited across the top of the veneer sheet 22 as the tank travels the length of the veneer. Preferably suitable means (not shown) are provided to drive the nip rolls 56 so as to feed the sheet 53 from the tank at the rate it is deposited on the veneer sheets. When the tank 34 reaches the end of its first stroke, a core or cross-band veneer 26 is moved from a stack 70 thereof positioned immediately beside the frame 30 (see FIG. 5) and deposited on top of the adhesive impregnated sheet 53 just laid down on the veneer 22. This transfer of veneer 26 may be done manually or by suitable automatic equipment (not shown). The tank 34 will automatically return across the veneers on the elevator laying down an adhesive-impregnated sheet on the veneer 26. If plywood panels of 3-ply construction are being assembled, a face veneer 24 together with a face veneer 22 are now transferred to the stack on the elevator from a supply 72 of face veneer arranged adjacent the frame 30. If panels of a greater number of plies are being laid up, a single longitudinal grain veneer would be deposited on the elevator stack followed by additional cross-band veneers and longitudinal grain veneers to build up the desired number of layers. The lay-up is continued in sequence as the web 53 is woven back and forth until a desired number of panels has been laid up upon the elevator. The web 53 is then cut beneath the rolls 56 and the elevator 60 is lowered to deposit the stack upon the roll casings 64 and upon which the stack is transferred to another location for pressing in a suitable press (not shown). If the panels are to be separated for insertion into a stack press, the web 53 is simply cut or torn between panels to separate the same.

The fibrous web 53 may comprise any suitable material capable of retaining a sufficient amount of adhesive to attain the desired bond and having sufficient physical strength for the purposes described. Papers such as kraft, sulfite or blends of sulfite and groundwood comprise satisfactory web materials. Preferably a wet-strength resin should be incorporated in the paper during its manufacture in order to enhance its physical strength when it is impregnated with the adhesive. Since the paper provides the weakest link in the glue joint, preferably a minimum amount of paper is used consistent with other requirements. In general, papers of from about 10 to 30 pounds per ream of 3000 square feet basis weight may be used, but preferably the paper is between about 12 and 18 pounds per ream basis weight.

The adhesives which may be used in the practice of the invention are also of broad scope. In general, any liquid adhesive normally employed in plywood manufacture may be used which will impart the desired strength of bond to the finished panels and which has the requisite properties to permit impregnation of a carrier web and reasonable assembly time.

Another embodiment of the invention is illustrated in FIGS. 6, 7 and 8 wherein panels are laid up in a continuous manner. In this instance face veneers 90 are fed one by one into end-to-end alignment onto a horizontal conveyor 92 from a suitable supply such as stack 94. The conveyor 92 is driven continuously by suitable means such as a motor 96 to advance veneers in the direction indicated by the arrow in FIG. 6. The veneers 90 are advanced beneath a tank 34' similar to that previously described and in which a continuous sheet of paper 98 drawn from a supply roll 100 is impregnated with a suitable adhesive contained within the tank. The paper sheet 98 is brought into contact with the veneers 90 and continuously laid down upon such veneers as they are fed beneath the tank 34'.

Next a core or cross-band veneer 102 is fed upon the lay-up. Such veneer may be applied as individual sheets but preferably is drawn from a continuous roll 104 of the same arranged so that the veneer 102 will be continuously laid down upon the resin impregnated sheet 98 as the lay-up advances beneath the roll, as indicated in FIG. 6. The roll 104 is suitably journaled on posts 105 and pinch rolls 107 suitably driven or other suitable means are provided for feeding the veneer from the roll 104.

Next in line is another adhesive tank 34" in which another continuous sheet of paper 106 is impregnated with adhesive as it is drawn from a supply roll 108. The impregnated sheet is drawn from the tank and continuously deposited upon the cross-band or core veneer 102. At the next station, face veneers 110 removed from a supply stack 112 are laid upon the assembly in registry with the veneers 90 as they pass beneath. Obviously additional layers of veneer may be laid up in similar manner to the process just described if more than 3-ply plywood is being manufactured.

From the conveyor 92 the panels may be fed by any suitable means to a stack press, but preferably are fed to a continuous press indicated generally at 116 in FIG. 7 and comprising upper and lower sections 118, 120, respectively, which are of similar construction but of reverse position. Each section comprises an endless belt 122 passing about rolls 124. The belts are arranged upon the corresponding section so as to present horizontal flights between which are received the laid up panels from the conveyor 92. Suitable means are provided for driving the belts in the direction indicated. The belts 122 and rollers 124 are arranged to convey the panels through the press 116. A heating platen 128 is provided on each section to heat the panels and exert pressure thereon as they pass between the sections so as to heat the adhesive in the paper webs 98, 106 and cause the same to set. After emerging from the press 116 the panels may be separated by severing the webs 98, 106 and stacked or otherwise handled as desired.

Figure 10:
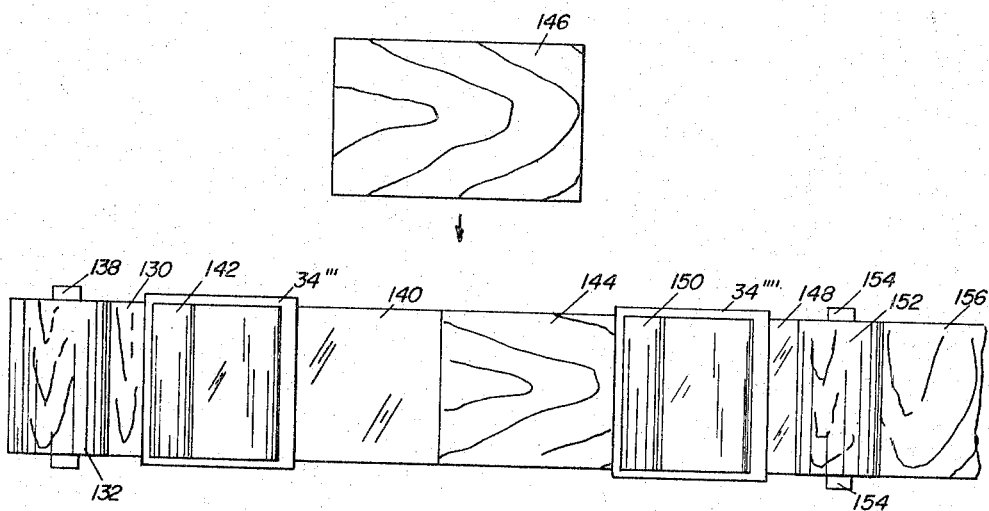
FIG. 10 is a plan view of the apparatus shown in FIG. 9.

In accordance with the embodiment of the invention shown in FIGS. 9 and 10 the opposite face veneers of a panel are drawn from continuous supply webs of the same. Thus a continuous length of face veneer 130 is drawn from a supply roll 132 onto a continuously moving conveyor 134 driven by a motor 136 or other suitable means. The roll 132 may be supported between standards 138 and suitable power driven feed rolls 139 may be provided to feed the veneer from the roll 132 at the desired rate. Fed onto the veneer 130 is an adhesive impregnated paper web 140 drawn from a supply roll 142 through an impregnating tank 34'''. Next a cross-band or core veneer 144 is removed from a supply stack 146 and placed upon the web 140. The assembly then advances beneath a further impregnating tank 34'''' through which another paper web 148 is led from a supply roll 150 and deposited upon the core veneer. Finally the assembly is passed beneath a supply roll 152 of face veneer supported between posts 154 and from which roll a continuous sheet of veneer 156 is fed by suitably driven feed rolls 157 and deposited upon the web 148. The lay-up so obtained may be passed to a continuous press such as described previously or the panels may be separated and placed in a conventional stack press for setting the adhesive.

As is apparent from the foregoing disclosure the apparatus of the invention permits substantial economies in labor costs in the lay-up of plywood. Further, since the veneer may be closer to final size, savings in veneer and adhesive spread may be obtained.

It will be also apparent that the invention is applicable to the formation of plywood utilizing either interior or exterior type thermosetting adhesive and that the process and apparatus of the invention may be utilized for bonding other types of woody products. For example, hardboard could be bonded to plywood or plywood to other wood composition boards and the like.

Having illustrated certain preferred embodiments of the invention it should be apparent to those skilled in the art that the invention permits of modification in arrangement and detail. We claim as our invention all such modifications as come within the true spirit and scope of the appended claims.

We claim:
1. Apparatus for lying up veneers in the manufacture of plywood comprising means for supporting a roll of a continuous fibrous web, means for impregnating said web with a liquid adhesive as it is drawn from said roll, and means for weaving said web back and forth to form a plurality of horizontally extending layers of the same.

2. Apparatus for laying up veneer in the manufacture of plywood comprising a roll of a continuous fibrous web, a tank for holding a supply of liquid adhesive, said tank having an aperture in the bottom thereof defined by a pair of nip rolls, said web being threaded through said tank and through said nip rolls, and means for reciprocating said tank in a horizontal path so that as said web is drawn through said tank it will be overfolded upon itself in a plurality of horizontal layers.

3. Apparatus for the manufacture of plywood comprising a conveyor, means for maintaining a first roll of veneer adjacent one end of said conveyor for feeding the veneer onto said conveyor, means for supporting first and second rolls of continuous fibrous webs above said conveyor, means for impregnating said webs with a liquid adhesive as they are drawn from said rolls, to be applied to said veneer, means for adding an intermediate veneer between said first and second webs and means for supporting a second roll of continuous veneer over said conveyor for feeding said veneer onto said conveyor.

4. In apparatus for the continuous lay-up of plywood panels, a horizontally disposed conveyor, means for feeding onto said conveyor a first substantially continuous layer of veneer, means for impregnating a first continuous sheet of paper with a liquid adhesive and feeding the same upon said first layer, means for feeding a second, substantially continuous layer of veneer onto said first sheet, means for impregnating a second continuous sheet of paper with a liquid adhesive and feeding the same upon said second veneer layer, means for feeding a third, substantially continuous layer of veneer onto said second layer, and conveyor means for applying heat and pressure to said veneer and the paper layers therebetween to set said adhesive.

References Cited

UNITED STATES PATENTS 2,323,105  6/1943  Welch _____ 156—264

FOREIGN PATENTS 510,803  8/1939  Great Britain.

EARL M. BERGERT, *Primary Examiner.*

R. J. ROCHE, *Assistant Examiner.*